B. O. RHODES.
UNIVERSAL JOINT.
APPLICATION FILED NOV. 15, 1919.
1,417,689. Patented May 30, 1922.
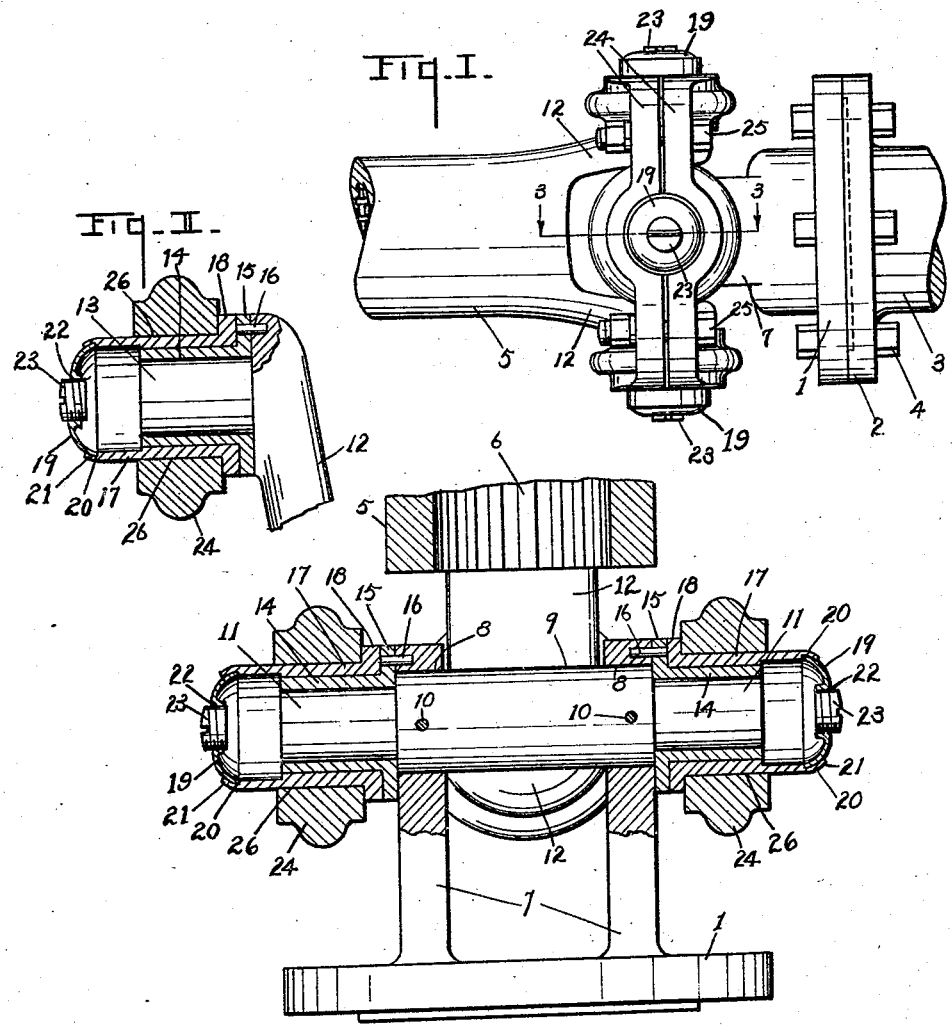
Inventor
Bert O. Rhodes

UNITED STATES PATENT OFFICE.

BERT O. RHODES, OF KALAMAZOO, MICHIGAN.

UNIVERSAL JOINT.

1,417,689.   Specification of Letters Patent.   Patented May 30, 1922.

Application filed November 15, 1919. Serial No. 338,265.

*To all whom it may concern:*

Be it known that I, BERT O. RHODES, a citizen of the United States, residing at the city and county of Kalamazoo, State of Michigan, have invented certain new and useful Improvements in Universal Joints, of which the following is a specification.

This invention relates to improvements in universal joints.

The main objects of this invention are:

First, to provide an improved universal joint which may be assembled with the propeller shaft and installed in a motor vehicle as a unit.

Second, to provide an improved universal joint of simple and durable structure.

Third, to provide an improved universal joint which is simple and economical in structure and at the same time strong and durable and easily lubricated.

Further objects and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a detail elevation of a structure embodying the features of my invention.

Fig. II is an enlarged detail view mainly in longitudinal section showing details of the journals and bearings of one of the joint members.

Fig. III is an enlarged detail view partially in longitudinal section on a line corresponding to line 3—3 of Fig. I showing details of the journals and bearings of the other joint member.

In the drawing similar reference characters refer to similar parts throughout the several views, and the sectional views are taken looking in the direction of the little arrows at the ends of the section lines.

Referring to the drawing, the joint member 1 has a disk-like body portion adapted to be connected to the flange 2 of the shaft 3 which is represented as the transmission shaft of a motor vehicle. The joint member 1 is connected to this flange by means of the bolts 4. The joint member 5 is tubular and adapted to receive the propeller shaft of a motor vehicle, being provided with internal splines 6 for driving engagement with the same and permitting a longitudinal sliding movement of the parts.

The joint member 1 is provided with a pair of arms 7 having aligned holes 8 therein for the journal pin 9 which is removably secured in the arms as by means of the pins 10. The pin is secured in the arms so that its journals 11 project as clearly shown in Fig. III. The joint member 5 is provided with fork-like arms 12 having integral journals 13 thereon. The journals are provided with bearing bushings 14 having out-turned flanges 15 at their inner ends, these bushings being secured against rotation on the journal by means of the pins 16.

The bearing members 17 have outwardly projecting flanges 18 at their inner ends co-acting with these flanges 15 to receive the thrust of the joint. The bearing members 17 project beyond the ends of the journals and are provided with caps 19, the bearing members being internally shouldered at 20 to receive the caps which are sheet metal stampings, the bearing members then being spun or crimped over the caps at 21, thereby permanently retaining them in the bearing members. The caps are provided with openings 22 closed by the threaded plugs 23. These bearing members and the bushings may be formed as stampings or die-castings and easily case-hardened. They may be easily renewed as occasion requires, which results in great economy in manufacture and very materially adds to the life of the joint.

I provide an annular coupling member formed of sections 24 secured together by bolts 25. These coupling members are provided with opposed seats or offsets 26 forming seats for the bearing members 17. One of the sections 24 is adapted to be slipped over the arms 7 of the joint member 1 when the journal pin 9 is removed. The other section may be slipped over the end of the joint member 5 thus providing for the readily assembling of the parts notwithstanding the disk-like form of the body member 1.

This arrangement of parts permits the assembling of the universal joints with the propeller shaft, there usually being a joint at each end thereof, and the assembling thereof in a motor vehicle as a unit as the joint members 1 may be readily connected to the flanges of the transmission and driven shafts of the vehicle. This is a decided advantage as it permits the assembling of the joints in the shop or factory, and the assembling of the entire unit as such saves time in the assembling of the vehicle. It also permits the assembling and final testing of the joint by workmen especially qualified and with devices especially adapted to that end. The bearing parts are effectively lubricated, it being found that the lubricant is effectively retained and that a small amount is sufficient for perfect lubrication for quite a long time.

Having thus described my invention, what I claim as new and desire to secure by Letters Patent is:

1. In a universal joint, the combination of a joint member comprising a disk-like body portion adapted to be connected with a flange of a coacting shaft and having a pair of journal pin arms, a journal pin removably secured in said arms with its journals projecting, a second joint member provided with a tubular body portion having internal splines for sliding engagement with a coacting shaft and having arms provided with integral journals, bushings having outwardly projecting flanges at their inner ends non-rotatably secured to said journals, an annular coupling member formed of detachably connected sections having opposed recesses constituting bearing member seats, one of said sections being adapted to be slipped upon and to be removed from the arms of the first mentioned joint member when the journal pin is removed, the other being adapted to be slipped over the second mentioned joint member, and bearing members clamped in said seats and having flanges at their inner ends coacting with the flanges of said bushings, said bearing members having caps closing their outer ends and being extended beyond the journals and constituting lubricant receptacles.

2. In a universal joint, the combination of a joint member having a pair of journal pin arms, a journal pin removably secured in said arms with its journals projecting, a second joint member having arms provided with integral journals, bushings having outwardly projecting flanges at their inner ends non-rotatably secured to said journals, an annular coupling member formed of detachably connected sections having opposed recesses constituting bearing member seats, one of said sections being adapted to be slipped upon and to be removed from the arms of the first mentioned joint member when the journal pin is removed, the other being adapted to be slipped over the second mentioned joint member, and bearing members clamped in said seats and having flanges at their inner ends coacting with the flanges of said bushings, said bearing members having caps closing their outer ends and being extended beyond the journals and constituting lubricant receptacles.

3. In a universal joint, the combination of a joint member comprising a disk-like body portion adapted to be connected with a flange of a coacting shaft and having a pair of journal pin arms, a journal pin removably secured in said arms with its journals projecting, a second joint member provided with a tubular body portion having internal splines for sliding engagement with a coacting shaft and having arms provided with integral journals, bushings non-rotatably secured to said journals, an annular coupling member formed of detachably connected sections one of which is adapted to be slipped upon and to be removed from the arms of the first mentioned joint member when the journal pin is removed, the other being adapted to be slipped over the second mentioned joint member, and bearing members carried by said coupling, said bearing members having caps closing their outer ends and being extended beyond the journals and constituting lubricant receptacles.

4. In a universal joint, the combination of a joint member comprising a disk-like body portion adapted to be connected with a flange of a coacting shaft and having a pair of journal pin arms, a journal pin removably secured in said arms with its journals projecting, a second joint member provided with a tubular body portion having internal splines for sliding engagement with a coacting shaft and having arms provided with integral journals, bushings non-rotatably secured to said journals, an annular coupling member formed of detachably connected sections, one of which is adapted to be slipped upon and to be removed from the arms of the the first mentioned joint member when the journal pin is removed, the other being adapted to be slipped over the second mentioned joint member, and bearing members carried by said coupling member.

5. In a universal joint, the combination of a joint member having a pair of journal pin arms, a journal pin removably secured in said arms with its journals projecting, a second joint member having arms provided with integral journals, bushings non-rotatably secured to said journals, an annular coupling member formed of detachably connected sections, one of which is adapted to be slipped upon and to be removed from the arms of the first mentioned joint member when the journal pin is removed, the other being adapted to be slipped over the second mentioned joint member, and bearing members clamped between said coupling member sections.

In witness whereof I have hereunto set my hand and seal in the presence of two witnesses.

BERT O. RHODES. [L. S.]

Witnesses:
GRACE B. THOMPSON,
LORENA G. SUMMERS.